United States Patent [19]

Bolon et al.

[11] 4,452,968

[45] Jun. 5, 1984

[54] SYNTHESIS OF POLYCARBONATE FROM DIALKYL CARBONATE AND BISPHENOL DIESTER

[75] Inventors: Donald A. Bolon; John E. Hallgren, both of Scotia, N.Y.

[73] Assignee: General Electric Company, Schenectady, N.Y.

[21] Appl. No.: 479,049

[22] Filed: Mar. 25, 1983

Related U.S. Application Data

[63] Continuation-in-part of Ser. No. 325,879, Nov. 30, 1981, abandoned.

[51] Int. Cl.$^3$ ............................................. C08G 63/62
[52] U.S. Cl. ...................................... 528/271; 528/86; 528/219; 528/370; 528/371
[58] Field of Search ................. 528/271, 86, 219, 370, 528/371

[56] References Cited

U.S. PATENT DOCUMENTS

| | | | |
|---|---|---|---|
| 4,096,169 | 6/1978 | Chalk | 260/463 |
| 4,182,726 | 1/1980 | Illuminati et al. | 260/463 |
| 4,187,242 | 2/1980 | Chalk | 260/463 |
| 4,201,721 | 5/1980 | Hallgren | 260/463 |
| 4,360,477 | 11/1982 | Hallgren et al. | 260/463 |

*Primary Examiner*—Harold D. Anderson
*Attorney, Agent, or Firm*—William H. Pittman; James C. Davis, Jr.; James Magee, Jr.

[57] ABSTRACT

Polycarbonates are formed by the interaction of a bisphenol diester, carbon monoxide and oxygen. The initial polycarbonate product is an oligomer which, upon heat treatment, polymerizes to a high molecular weight polycarbonate. The products produced according to the present invention are chainstopped prior to heat treatment, making them less thermally and oxidatively sensitive.

4 Claims, No Drawings

SYNTHESIS OF POLYCARBONATE FROM DIALKYL CARBONATE AND BISPHENOL DIESTER

This application is a continuation-in-part of copending application Ser. No. 325,879, filed Nov. 30, 1981, now abandoned.

Various routes have been described for the production of polycarbonates. Some of these are employed commercially, and some have merely been described in the literature.

A particularly desirable method for forming polycarbonates would involve an ester interchange reaction. While various reactions of this type have been described in the prior art, none have truly been acceptable. What is desired is a truly integrated process for the production of polycarbonates, employing a minimum number of initial reactions, and the ability to recycle the various byproducts from the process.

One of the major components employed in accordance with the present invention, particularly in accordance with the ester interchange reaction, is a dialkyl carbonate. One particularly desirable method for producing such a dialkyl carbonate is described and claimed in copending, commonly assigned application Ser. No. 319,509, filed Nov. 9, 1981, now U.S. Pat. No. 4,360,477, the disclosure of which is incorporated by reference herein.

In accordance with the present invention, a process is described for the preparation of high molecular weight polycarbonates from a bisphenol, an alkanol, carbon monoxide and oxygen. The primary intermediates employed in the process, which involves a number of steps, are dialkyl carbonates and a bisphenol diester, the latter components being employed in an ester interchange reaction.

In the preferred mode of carrying out the present invention, the following steps are involved:

1. synthesis of dialkyl carbonate, particularly dimethyl carbonate, from an alkanol, oxygen, and carbon monoxide;
2. an ester interchange reaction between the dialkyl carbonate produced according to step 1 and a bisphenol diester, particularly bisphenol-A diacetate, to form a polycarbonate oligomer and an alkyl ester and heating of the oligomer to form the high molecular polycarbonate;
3. thermolysis of the alkyl ester produced according to step 2, particularly methyl acetate, to produce a ketene and reform the alkanol;
4. reaction of the bisphenol with the ketene of step 3 to form bisphenol diesters. The alkanol, particularly methanol, produced in step 3 is recycled to step 1.

The polycarbonates produced in accordance with the process of this invention are chain stopped with both acyloxy and carboalkoxy groups, particularly acetoxy and carbomethoxy groups.

The initial polycarbonate produced in accordance with step 2 is generally a relatively low molecular weight oligomer having from 1 to 4 repeating units. Higher molecular weight polymers are then produced by heating this oligomer in the presence of a catalyst. Because the oligomer heated is chain stopped with the acyloxy and the carboalkoxy groups, the problems, (e.g., such as oxidation) often encountered in the heating of hydroxy chain-stopped polycarbonates are not experienced.

DESCRIPTION OF THE PREFERRED EMBODIMENTS

In accordance with the present invention, an integrated process for the production of polycarbonate resins from bisphenol, e.g., bisphenol-A, carbon monoxide, and oxygen has been discovered. While the bisphenol-A illustrated is bisphenol-A, it should be appreciated that, though bisphenol-A is the preferred material, the process of the present invention is not limited to that material but can be any bisphenol having two hydroxy groups on the aromatic nucleus.

As indicated, the process of the present invention is an integrated process. Generally, the reactions included in the integrated process are the following:

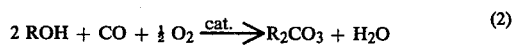

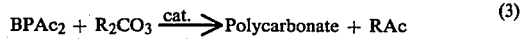

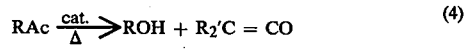

where R is a primary alkyl group, BP is a bisphenol moiety, Ac is an acyloxy radical, and $R'_2C=C=O$ is the residue after thermolysis of the RAc. Preferably, R is selected from the group consisting of methyl, ethyl, propyl, etc., BP is preferably selected from the class consisting of tetramethyl bisphenol-A, biphenol, tetrabromo bisphenol-A and bisphenol-A; and Ac is selected from the class consisting of acetoxy, propionoxy, etc. Most preferably, from the standpoint of ease of reaction and utilization of the finally prepared material, R is methyl, BP is bisphenol-A, Ac is acetoxy, and each R' is H.

The production of dialkyl carbonates, particularly dimethyl carbonate, from an alkanol, carbon monoxide, and oxygen is described in a number of places. For example, a preferred method of forming the dialkyl carbonate, particularly dimethyl carbonate, is shown in the aforementioned U.S. Pat. No. 4,360,477. Other methods for forming the dialkyl carbonates are shown, for example, in the following U.S. Pat. Nos.:

3,114,762—Mador et al.
3,227,740—Fenton
3,846,468—Perrotti et al
3,952,045—Gaenzler et al
4,131,521—Cipris et al Since it is desired that the polycarbonates produced in accordance with the present invention, as the final desired product, be as colorless as possible, the dialkyl carbonate is preferably purified prior to utilization in equation (3) of the overall reaction of the present invention. For example, dimethyl carbonate may contain, as impurities, hydrocarbons, water, methanol, amines, and electrolytes, as well as other organics. One purification scheme that has been found to be acceptable is the extraction of dimethyl carbonate with an equal volume of water, followed by a careful distillation to remove the water-dimethyl carbonate azeotropic mixture.

In the second step of the process for production of a polycarbonate, there is an ester interchange reaction between a bisphenol diester and the dialkyl carbonate produced in accordance with equation (3). The reaction between the bisphenol diester and the dialkyl carbonate is a catalytic reaction and, generally, is carried out in two stages. The first stage is usually carried out under pressure at a temperature of from 180° to 300° C., advantageously in the presence of a catalyst such as a titanate. Preferably, the reaction is carried out at 180° to 220° C. and there appears to be no real economic advantage in proceeding at temperatures over 300° C. In fact, in some instances, too high a temperature may cause decomposition of either or both the reactants and the reaction product. Generally, the reaction requires about 0.1 to 2 hours for completion around 180° C. The reactants are employed in stoichiometric ratios, ±10%.

The pressure can be varied widely and only sufficient pressure is used to allow heating of the reaction mixture at temperatures above 180° C. Generally, the pressure range is from 100 to 350, or more, psig, preferably from about 150 to 200 psig. This allows the alkyl acylate, particularly methyl acetate, to be removed from the reaction by distillation. The product which forms during this reaction is a low molecular weight oligomer of a polycarbonate having the formula:

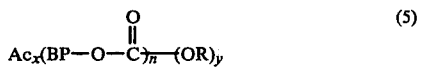
(5)

where Ac, BP, and R are as previously defined, n is from 1 to 4, and the sum of x and y is 2. Where Ac is acetoxy, R is methyl, and BP is the residue of bisphenol-A, it has been found that, on average, n is 1.4, x is 0.8, and y is 1.2. Preferably x is a value from 0.2 to 1 and y is a value from 1.0 to 1.8. During the formation of the material of formula (5), an alkyl ester, such as methyl acetate, in the preferred embodiment, is distilled.

Upon formation of the material of formula (5), as indicated above, further reaction can be carried out to increase the chain length of the polycarbonate, and the heating can now be accomplished without pressure. Any remaining alkyl ester formed from the condensation of the end groups is distilled. If desired, a vacuum may be applied to aid in removal of the alkyl ester. Full reaction to a high molecular weight polycarbonate resin is generally obtained, with a mild vacuum at about 280° C., in about 5 minutes. The higher molecular weight polycarbonate resin has the formula

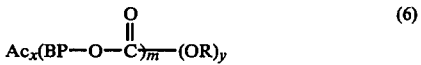
(6)

wherein Ac, BP, R, x and y are as previously defined and m is greater than 10 and may be as high as 1000 or more.

As previously indicated, and as shown in formula (6), the chain stoppers formed in the product produced in accordance with the present invention are generally acyloxy and carbalkoxy, not hydroxy. This is of particular advantage in avoiding heat degradation of the material and allowing the production of high molecular weight materials without such heat degradation byproducts.

If desired, in the second stage of reaction in accordance with equation (3), phenols, such as phenyl ester, (e.g., phenyl acetate) can be added. These will react with the end groups shown in formula (6) to leave a terminal phenyl group to chain stop the polymer and provide basis for a controlled, desired molecular weight.

In the last step of the integrated process, the alkyl ester, preferably methyl acetate, is heated, in order to regenerate the alkanol employed in step 1 and a ketene. The particular ketene produced will, of course, depend upon the particular alkyl ester which is heated. When the preferred methyl acetate is heated, ketene is the result. The ketene is reacted with the appropriate bisphenol in the presence of a catalyst such as AlPO$_4$ to produce a bisphenol diester for use in the step of the reaction described in accordance with equation (3). Thus, in the preferred embodiment, ketene is reacted with bisphenol-A to produce bisphenol-A diacetate. The prior art does describe the reaction of ketene with monohydric phenols, but no prior art disclosure (as far as is known) of the reaction of any ketene with a bisphenol, such as bisphenol-A, has been described.

Thus, a fully integrated process has been described for the formation of a polycarbonate employing, as raw materials, a bisphenol, diester, carbon monoxide, and oxygen.

While not previously mentioned, it is preferred that the bisphenol diester component be purified, for the same reasons as purification of the dialkyl carbonate.

None of the prior art has shown the integrated process in accordance with the present invention. There have been prior descriptions of the reactions of dialkyl carbonates and phenyl acylates. For example, a similar type of reaction is shown in West German DS No. 1,067,213, but the reaction in accordance with the present invention cannot be run under the conditions set forth in that patent, because due to side reactions, there are limitations on high molecular polymers. Similarly, U.S. Pat. No. 4,182,726 describes a reaction employing a large excess of a dialkyl carbonate.

The reaction of the bisphenol diester and dialkyl carbonate is generally carried out in the presence of a catalyst. A large number of catalysts can be employed, such as Ti$^{+4}$, Sn$^{+4}$, Zr$^{+4}$, B$^{+3}$, Al$^{+3}$, P$^{+3}$, Zn$^{+2}$, as well as metal salts of organic acids which are useful in transesterification reactions. Examples of titanium and zirconium salts which can be employed may be found in U.S. Pat. No. 4,297,439-Stark. The preferred amount of titanate catalyst employed in the reaction is from about 0.001 to 0.05%, by weight, titanate catalyst calculated as titanium dioxide, (or similar weights of other catalysts), based on 100 parts, by weight of the bisphenol.

Among the organic titanates which may be employed include chelated titanates such as acetylacetonate titanate, lactate titanate, triethanolamine titanate, polyhydroxystearate titanate, a glycolate titanate (e.g., tetraoctylene glycol titanate containing approximately 7.8% Ti and sold under the trademark Tyzor OG by E. I. du Pont de Nemours and Company or di-n-butyl hexylene glycol titanate), and nonchelated titanates such as tetraisopropyl titanate, tetrabutyl titanate, polymerized tetrabutyl titanate, tetrakis (2-ethylhexyl) titanate, etc.

In place of organic titanates, organic zirconate curing agents can be used as catalysts including, for example, zirconium acetylacetonate, zirconium-tert-butoxide, zirconium hexafluoroacetylacetonate, zirconium naphthenate, zirconium propoxide, zirconium isopropoxide, etc. Many other catalysts for heat treatment of the oligomer to the higher molecular weight polycarbonate, many examples of which have been given above (e.g., tin salts, zinc salts, lead salts, preferably organic salts, etc.) may be used without departing from the scope of the invention.

EXAMPLE 1

A quantity of 41 parts of dimethyl carbonate, was combined with 70 parts of bisphenol-A diacetate and 0.15 part tetraphenyl titanate in a stainless steel pressure reactor equipped with means for distillation. The mixture was pressurized to 200 psig with nitrogen and heated for 30 minutes to 220° C. The temperature at the distillation head rose to 140°–150° C., and material distilled. Upon cooling, the receiver was analyzed by gas chromatography and was found to contain a mixture of 20 parts methyl acetate and 8.4 parts dimethyl carbonate, a ratio of 70% to 30%. The pot residue consisted of a viscous fluid of the structure shown in formula (5) with average n equal to 2.2 and a ratio of carbomethoxy/acetoxy end groups of 1.2; Ac was acetyl, BP was bisphenol-A, and R was methyl. No evidence of hydroxyl end groups was found.

EXAMPLE 2

The oligomer formed in accordance with Example 1 was placed in a round bottom reaction vessel at atmospheric pressure. The material was heated to 280° C. for about 30 minutes, while applying vacuum. The resulting material was a polymer which, by gel permeation chromatography, had an average molecular weight of about 25,000.

EXAMPLE 3

A quantity of 50 parts dimethyl carbonate, 86 parts bisphenol-A diacetate, and 0.018 part tetraphenyl titanate was reacted for 1 hour at 240° C. and 200 psig. Analysis of the pot residue by gel permeation chromatography indicated the presence of low molecular weight oligomers of formula (5) where Ac was acetyl, x was 0.8, BP was the residue of bisphenol-A, n was 1.4, R was methyl, and y was 1.2. This was shown to be the "average" of the oligomers present in the pot residue. The reaction was exceptionally clean and there was no evidence of side reactions, to form salicylates, ketene evolution to form a phenolic end group, or displacement on the methyl group of dimethyl carbonate to form methyl ethers.

EXAMPLE 4

The residue from Example 3 was heated to 300° C. to further couple the carbomethoxy and acetoxy linkages and a vacuum was applied to facilitate the removal of the coproduced methyl acetate. Because of initial foaming, devolatilization was required prior to the heating step. To remove the dimethyl carbonate and methyl acetate remaining in the pot residue, the mixture was heated to 250° C. in a stream of nitrogen for 30 minutes, and then evacuated for 5 minutes. Upon cooling, the mixture solidified. The devolatilized mixture was stirred in a reaction vessel immersed in a Wood's Metal Bath maintained at 300° C. at a pressure of about 5 mm. The mixture rapidly became viscous as methyl acetate was removed. After 30 minutes, the resin was cooled to room temperature and shown to have an average molecular weight of over 30,000 by gel permeation chromatography. Analysis by $^{13}C$ nuclear magnetic resonance failed to detect either carbomethoxy or acetoxy end groups.

EXAMPLES 5–8

High molecular weight polycarbonates were produced in the same manner as described in Example 4, with average molecular weight as indicated below in Table 1. A commercial Lexan ® polycarbonate resin is shown for comparison purposes. The polycarbonate resins of Examples 5–8 could by employed for the same purposes as the Lexan ®.

TABLE 1
MOLECULAR WEIGHT OF POLYCARBONATE RESINS

| Example | Average Molecular Weight |
|---|---|
| 5 | 30,000 |
| 6 | 82,000 |
| 7 | 60,500 |
| 8 | 45,200 |
| Lexan ® | 61,000 |

EXAMPLE 9

Into a stainless steel pressure vessel equipped with a stirrer, provision for heating, and a stainless steel column packed with glass beads and equipped with a receiver, was charged 86 parts of bisphenol-A diacetate, 50 parts of dimethyl carbonate, and 0.018 part tetraphenyl titanate. The mixture was pressurized with 200 psig nitrogen and heated to 220°–230° C. for one hour. The temperature at the top of the distillation column rose to 150°–155° C. and 30 parts of distillate were obtained. Gas chromatographic analysis of the distillate indicated the presence of 24.9 parts (61% of theory) of methyl acetate and 5.1 parts (10% of theory) of dimethyl carbonate. The pot residue was slightly viscous and was analyzed by $^{13}C$ nuclear magnetic resonance as 13.3 mol percent methyl acetate, 25.4 mol percent aryl acetate end groups, 31.3 mol percent aryl methyl carbonate end groups, and 18.0 mol percent internally linked diaryl carbonate. Gel permeation chromatography indicated an average degree of polymerization of about 1.3, and no oligomer consisting of more than 4 bisphenol-A units.

In accordance with the present invention, an integrated process for the production of polycarbonate resins from a bisphenol, carbon monoxide, and oxygen has been shown. While various reaction steps are included, materials other than those just set forth are, essentially, recycled. The initial product produced is a prepolymer, or oligomer, having from about 1 to 4 repeating bisphenol units. A simple heating process, in the presence of a suitable catalyst, such as tetraphenyl titanate, in a vacuum, converts this oligomer to a high molecular weight polycarbonate resin which can be employed in the same manner as polycarbonate resins now commercially available.

Replacement of dimethyl carbonate in Example 1 with diethyl carbonate, dipropyl carbonate, etc. will give essentially, the same results as those set forth in Example 1. Similarly, replacement, in Example 1, of bisphenol-A with tetramethyl bisphenol-A, biphenol, or tetrabromo bisphenol-A will provide essentially the same results. Further, replacement of bisphenol-A diacetate with for example, bisphenol-A dipropionate will provide essentially the same results.

The bisphenol-A diacetate employed in the above examples can be prepared by a reaction between bisphenol-A and the ketene which results from the thermolysis step of equation (4). If desired, the ketene could be employed to prepare a reactive acylating agent, such as acetic anhydride or isopropenyl acetate, with this acylating agent being employed to produce the bisphenol-A diacetate and acetic acid, or acetone, respectively. The reaction of the ketene with the bisphenol-A to prepare the bisphenol-A diacetate is preferred.

The bisphenol-A diacetate employed in the preceding examples was purified from a mixture containing approximately 99.5% of the diacetate and 0.5% of the monoacetate. This mixture was treated with 5 mol % acetic anhydride, based on the weight of the diacetate, and 100 ppm aqueous HCl. After vacuum distillation, less than 1 ppm hydroxyl group remained in the purified bisphenol-A diacetate. One can employ recrystallization of the treated diacetate from hexane in place of the vacuum distillation.

EXAMPLE 10

Synthesis of bisphenol-A diacetate

A quartz column $\frac{3}{8}" \times 2'$ packed with 19.0 grams of 9.4%, by weight, $H_3PO_4$ on gamma alumina was maintained at 600°–650° C. Methyl acetate (10.0 grams, 0.135 mol) was vaporized into the column with a 0.3 liter/min. nitrogen purge to form ketene. The effluent (which contained the ketene) from the column passed through a cold trap maintained at $-20°$ C. to remove coproduced methanol, then through a solution of 15.0 grams (0.066 mol) bisphenol-A dissolved in 15 ml of methyl acetate and 0.1 gram of trifluoroacetic acid. Analysis indicated the presence of 8.0 grams (35%) of bisphenol-A diacetate, 18.2 grams (50%) of bisphenol-A monoacetate, and 1.65 grams (11%) of recovered bisphenol-A. The above-formed bisphenol-A diacetate can be reacted with dimethyl carbonate to form a polycarbonate composition similarly as has been described previously.

It will of course be understood to those skilled in the art that in addition to the conditions recited above, other conditions for formation and reaction of ingredients can be employed within the scope of the invention. In addition, other catalysts, many examples of which have been given earlier, can be used in the reaction of the bisphenol diester and the dialkyl carbonate to form polycarbonate resins. Any other modifications within the scope of the claimed invention are contemplated by the inventors and are to be considered coming within the scope of the inventive concept herein disclosed and claimed.

What is claimed is:

1. A process for producing a polycarbonate resin of the formula

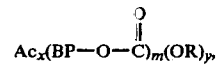

where Ac is an acyloxy radical, BP is the residue obtained by removing the hydroxy groups from a bisphenol, R is an alkyl radical, m is a number greater than 10, x is a number from 0.2 to 1, y is a number from 1.0 to 1.8, and the sum of x and y is 2, comprising the steps of:
   A. reacting an alkanol of the formula ROH with carbon monoxide and oxygen to produce a dialkyl carbonate and water, and removing said water;
   B. reacting said dialkyl carbonate with a bisphenol diester of the formula $BPAc_2$ in contact with a catalyst to produce an oligomer having the formula

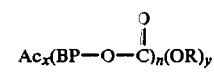

where n is a number from 1 to 4, and an alkyl ester of the formula RAc;
   C. separating said alkyl ester and heating it to produce said alkanol and a ketene, and recycling said alkanol to step A;
   D. separating said ketene, reacting said ketene with said bisphenol to produce said bisphenol diester, and recycling said bisphenol diester to step B; and
   E. heating the oligomer produced in step B in contact with said catalyst to produce said polycarbonate resin.

2. The process of claim 1 wherein Ac is selected from the class consisting of acetoxy and propionoxy; BP is the residue obtained by removing the hydroxy groups from a bisphenol selected from the class consisting of bisphenol-A, tetramethyl bisphenol-A, biphenol and tetrabromo bisphenol-A; and R is selected from the class consisting of methyl, ethyl and propyl.

3. The process of claim 2 wherein Ac is acetoxy, BP is the residue obtained by removing the hydroxy groups from bisphenol-A, and R is methyl.

4. The process of claim 2 wherein step B is conducted in contact with 0.001 to 0.005% by weight, calculated as $TiO_2$ and based on bisphenol-A, of a titanate catalyst at a temperature from 180° to 300° C.

* * * * *